(12) United States Patent
Yezerets et al.

(10) Patent No.: US 8,590,290 B2
(45) Date of Patent: Nov. 26, 2013

(54) METHODS, SYSTEMS, AND APPARATUSES OF SCR DIAGNOSTICS

(75) Inventors: Aleksey Yezerets, Columbus, IN (US); Neal W. Currier, Columbus, IN (US); Zheng Liu, Knoxville, TN (US); Joan M. Wills, Nashville, IN (US); Abdul R. Ofoli, Columbus, IN (US); Michael R. Haas, Columbus, IN (US); Andrew W. Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 332 days.

(21) Appl. No.: 12/551,747

(22) Filed: Sep. 1, 2009

(65) Prior Publication Data

US 2011/0047964 A1   Mar. 3, 2011

(51) Int. Cl.
*F01N 3/00* (2006.01)
(52) U.S. Cl.
USPC ............... 60/277; 60/274; 60/276; 60/286; 60/295; 60/301; 60/303
(58) Field of Classification Search
USPC ............ 60/274, 276, 277, 286, 295, 301, 303
See application file for complete search history.

(56) References Cited

U.S. PATENT DOCUMENTS

| | | | |
|---|---|---|---|
| 6,517,702 B2 | 2/2003 | Stahl | |
| 6,662,553 B2 | 12/2003 | Patchett et al. | |
| 6,701,707 B1 | 3/2004 | Upadhyay et al. | |
| 6,925,796 B2 | 8/2005 | Nieuwstadt et al. | |
| 6,947,831 B2 * | 9/2005 | van Nieuwstadt | 701/114 |
| 7,150,145 B2 | 12/2006 | Patchett et al. | |
| 7,178,328 B2 | 2/2007 | Solbrig | |
| 7,610,750 B2 * | 11/2009 | Viola et al. | 60/286 |
| 7,650,746 B2 * | 1/2010 | Hu et al. | 60/286 |
| 2008/0178656 A1 | 7/2008 | Nieuwstadt et al. | |

FOREIGN PATENT DOCUMENTS

| | | |
|---|---|---|
| WO | WO 2007/073324 A1 | 6/2007 |
| WO | WO 2008/103113 A1 | 8/2008 |

* cited by examiner

*Primary Examiner* — Thomas Denion
*Assistant Examiner* — Diem Tran
(74) *Attorney, Agent, or Firm* — Krieg DeVault LLP

(57) ABSTRACT

One embodiment is a method including operating an SCR system at a plurality of commanded ammonia to NOx input ratios, providing a plurality of data indicating NOx output from the SCR system for the plurality of commanded ammonia to NOx input ratios, and evaluating the plurality of data to diagnose the SCR system. Additional embodiment are methods, systems, and apparatuses including SCR diagnostics. Further embodiments, forms, objects, features, advantages, aspects, and benefits shall become apparent from the following description and drawings.

23 Claims, 4 Drawing Sheets

METHODS, SYSTEMS, AND APPARATUSES OF SCR DIAGNOSTICS

BACKGROUND

Selective catalytic reduction ("SCR") systems can be provided to reduce emissions of nitrogen oxides ("NOx") in a number of applications. Present approaches to SCR diagnostics suffer from a variety of limitations and problems including those respecting diagnosis of error or malfunction of SCR systems providing reduced NOx emission levels. There is a need for the unique and inventive methods, systems and apparatuses of SCR diagnostics disclosed herein.

SUMMARY

One embodiment is a method including operating an SCR system at a plurality of commanded ammonia to NOx input ratios, providing a plurality of data indicating NOx output from the SCR system for the plurality of commanded ammonia to NOx input ratios, and evaluating the plurality of data to diagnose the SCR system. Additional embodiments are methods, systems, and apparatuses including SCR diagnostics. Further embodiments, forms, objects, features, advantages, aspects, and benefits shall become apparent from the following description and drawings.

DETAILED DESCRIPTION

For purposes of promoting an understanding of the principles of the invention, reference will now be made to the exemplary embodiments illustrated in the figures and specific language will be used to describe the same. It will nevertheless be understood that no limitation of the scope of the invention is thereby created, and that the invention includes and protects such alterations and modifications to the illustrated embodiments, and such further applications of the principles of the invention illustrated therein as would occur to one skilled in the art to which the invention relates.

Figure 1:
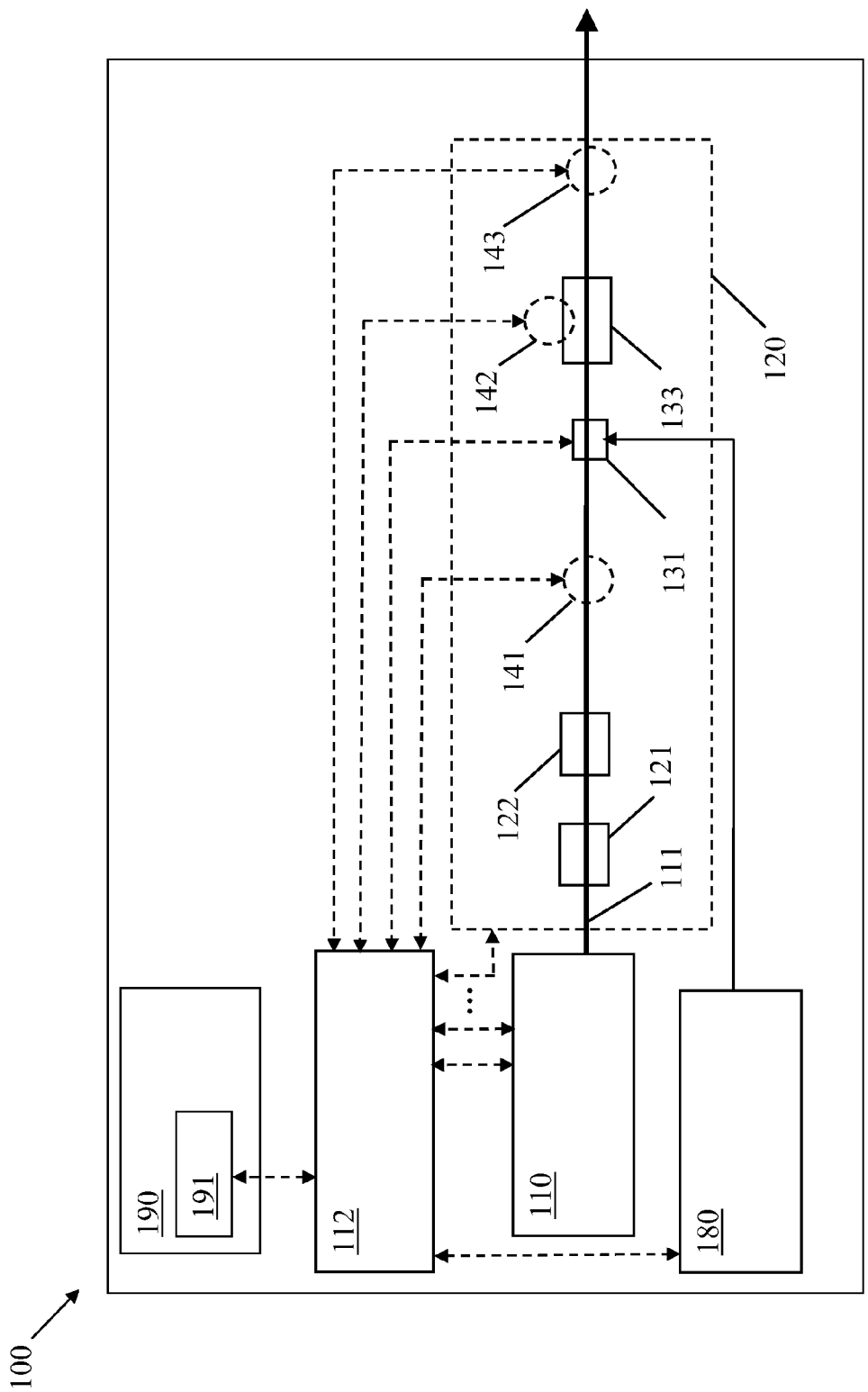
FIG. 1 is a schematic illustration of a vehicle including an exemplary SCR system.

With reference to FIG. 1 there is illustrated a vehicle 100 including an engine 110 which is configured to provide motive power to vehicle 100 and to output exhaust to an exhaust flow path 111. Vehicle 100 is illustrated schematically and may be a car, truck, bus, boat, recreational vehicle, construction equipment or another type of vehicle. Other embodiments include an engine provided in other applications such as a generator set. The exhaust output by engine 110 includes NOx which is to be reduced using an exhaust aftertreatment system 120. Exhaust aftertreatment system 120 includes oxidation catalyst 121 which is in fluid communication with exhaust flow path 111 and is operable to catalyze oxidation of one or more compounds in exhaust flowing through exhaust flow path 111, for example, oxidation of NO to $NO_2$.

Exhaust aftertreatment system 120 further includes diesel particulate filter 122 which is in fluid communication with exhaust flow path 111 and is operable to reduce the level of particulates in exhaust flowing through exhaust flow path 111. In an exemplary embodiment diesel particulate filter 122 is a catalyzed soot filter. Other embodiments utilize other types of diesel particulate filters.

Exhaust aftertreatment system 120 also includes reductant injector 131 and SCR catalyst 133. Reductant injector 131 is supplied with reductant from reservoir 180 and is operable to inject reductant into exhaust flow path 111. In an exemplary embodiment the reductant is an aqueous solution of urea which decomposes to provide ammonia. Other embodiments utilize different reductants, for example, aqueous solutions of ammonia, anhydrous ammonia, or other reductants suitable for SCR. Reductant injected into exhaust flow path is provided to SCR catalyst 133 which is in flow communication with exhaust flow path 111 and is operable to catalyze the reduction of NOx.

Exhaust flow path 111 is illustrated schematically in FIG. 1 and may be provided in a variety of physical configurations. In an exemplary embodiment exhaust flow path proceeds from the output of a turbocharger of engine 110 through a conduit to a can containing oxidation catalyst 121 and diesel particulate filter 122, through a second conduit which includes a urea decomposition reactor, to a can containing SCR catalyst 133 and an Ammonia Oxidation AMOX catalyst which is operable to catalyze reaction of ammonia which slips past SCR catalyst 133, and through another conduit which outlets to the ambient environment. Other embodiments, omit one or more of the foregoing elements, include additional elements, feature alternate elements, and/or feature different arrangements and configurations of elements.

Vehicle 100 includes a controller 112 that is generally operable to control and manage operational aspects of vehicle 100 including engine 110, exhaust aftertreatment system 120. Controller 112 includes memory as well as a number of inputs and outputs for interfacing with various sensors and systems of vehicle 100. Controller 112 can be an electronic circuit comprised of one or more components, including digital circuitry, analog circuitry, or both. Controller 112 may be a software and/or firmware programmable type; a hardwired, dedicated state machine; or a combination of these. In one embodiment, Controller 112 is of a programmable microcontroller solid-state integrated circuit type that includes memory and one or more central processing units. The memory of controller 112 can be comprised of one or more components and can be of any volatile or nonvolatile type, including the solid-state variety, the optical media variety, the magnetic variety, a combination of these, or other types of memory. Controller 112 can include signal conditioners, signal format converters (such as analog-to-digital and digital-to-analog converters), limiters, clamps, filters, and the like as needed to perform various control and regulation operations described herein. Controller 112, in an exemplary embodiment, may be a type of controller sometimes referred to as an electronic or engine control module (ECM), electronic or engine control unit (ECU) or the like, that is directed to the regulation and control of engine operation. Alternatively, Controller 112 may be dedicated to control of just the operations described herein or to a subset of controlled aspects of vehicle 100. In any case, controller 112 preferably includes one or more control algorithms defined by operating logic in the form of software instructions, hardware instructions, firmware instructions, dedicated hardware, or the like. These algorithms will be described in greater detail hereinafter, for controlling operation of various aspects of vehicle 100.

Controller 112 is in operative interconnection with various elements of vehicle 100 as illustrated in FIG. 1 with dashed lines extending between controller 112 and various elements of vehicle 100. These operative interconnections may be implemented in a variety of forms, for example, through input/output interfaces coupled via wiring harnesses. In other instances all or a portion of the operative interconnection between controller 112 and an element of vehicle 100 may be virtual, for example, a virtual input indicative of an operating parameter may be provided by a model implemented by controller 112 or by another controller which models an operating parameter based upon other information.

Controller 112 is in operative communication with exhaust flow sensor 141 which provides controller 112 with information indicative of exhaust flow rate. In an exemplary embodiment exhaust flow sensor 141 is a virtual sensor which uses a model to determine the exhaust space velocity through SCR catalyst 133 based upon operating conditions of engine 110, for example, information from an intake air flow sensor, fueling information and the volume of SCR catalyst 133. In other embodiments exhaust flow sensor 141 is another type of sensor, for example, a mass flow rate sensor which is in fluid communication with exhaust flow path 111.

Controller 112 is in operative communication with temperature sensor 142 which provides controller 112 with information indicative of the temperature of SCR catalyst 133. In an exemplary embodiment exhaust flow sensor 141 determines information indicative of the temperature of SCR catalyst 133 based on a weighted average of information from temperature sensors located at the input outlet of SCR catalyst 133. In other embodiments, information from temperature sensors in other locations or is utilized to determine information indicative of the temperature of SCR catalyst 133. In other embodiments exhaust flow sensor 141 may be positioned on or in close proximity to SCR catalyst 133 to determine information indicative of the temperature of SCR catalyst 133.

Controller 112 is in operative communication with NOx sensor 143 which provides controller 112 with information indicative of the level of NOx output from SCR catalyst 133. In an exemplary embodiment NOx sensor 143 is a physical sensor which is in fluid communication with exhaust flow path 111. Other embodiments may provide information indicative of the level of NOx output from SCR catalyst 133 using a greater number of sensors, or different types of sensors.

Controller 112 in also in operative communication with a virtual NOx sensor which provides controller 112 with information indicative of the level of NOx input to SCR catalyst 133 using a model based upon operating conditions of engine 110, for example, engine load, engine fueling, exhaust temperature and/or other parameters. In other embodiments NOx sensor 141 is a physical NOx sensor which is in fluid communication with exhaust flow path 111 and is located upstream from SCR catalyst 133.

During operation controller 112 uses the information indicative of the level of NOx provided to SCR catalyst 133 along with information from sensors 141 and 142 to determine the amount or rate of reductant to be injected by reductant injector 131. Controller 112 is in operative communication with reductant injector 131 and can command reductant injector 131 to inject selected amount of reductant or to inject reductant at a selected rate. In an exemplary embodiment controller 112 commands reductant injection that is determined to maximize the catalytic reduction of NOx by SCR catalyst 133, to maximize ammonia storage by SCR catalyst 133, and to minimize the slip of ammonia past SCR catalyst 133. In other embodiments controller 112 commands reductant injection to differently balance these parameters or to account for additional or different parameters.

Controller 112 is in operative communication with a malfunction indicator 191 which is provided in an operator compartment 190 of vehicle 100. Malfunction indicator 191 can be a malfunction indicator light, or another type of display operable to provide information to an operator of vehicle 100. Controller 112 is operable to command malfunction indicator 191 to display one or more indications based upon the diagnostics described herein, and may also store one or more error codes in a memory based upon the diagnostics described herein.

Figure 2:
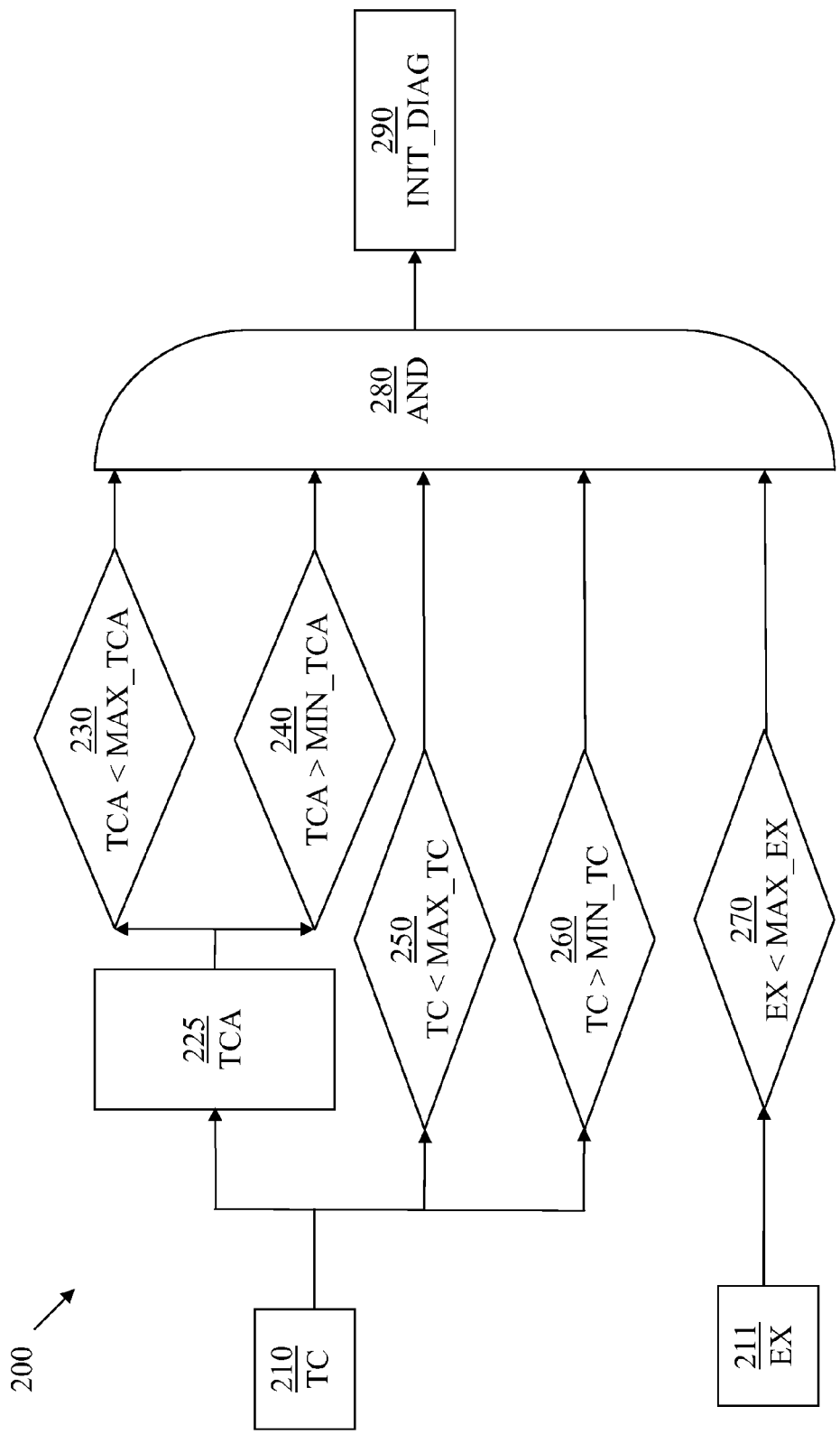
FIG. 2 is a flowchart illustrating an exemplary control procedure for initiating an SCR diagnostic procedure.

FIG. 2 is a flowchart illustrating an exemplary control procedure 200 for initiating an SCR diagnostic procedure. Procedure 200 may be implemented by controller 112 of vehicle 100 described above in connection with FIG. 1 or in another controller. Procedure 200 is directed to initiating a diagnostic procedure for an SCR system.

At operation 210 a value indicative of SCR catalyst temperature is stored as variable TC. The value of variable TC may be based upon information from a sensor such as sensor 142 or another sensor adapted to provide information indicative of the temperature of an SCR catalyst. Variable TC is provided to operation 225, conditional 250, and conditional 260.

Operation 225 determines a value indicative of the average SCR catalyst temperature over a time period and stores this value as variable TCA. In one embodiment variable TCA stores a value indicative of the average SCR catalyst temperature over the preceding minute. In other embodiments variable TCA stores a value indicative of the average SCR catalyst temperature over different time periods. Variable TCA is provided to conditional 230 and conditional 240.

Conditional 230 tests whether variable TCA is less than MAX_TCA which is a calibratable maximum average catalyst temperature below which SCR diagnostics may be initiated. In one embodiment MAX_TCA is set to 550° C. In other embodiments MAX_TCA is set to a value between 500° C. and 600° C. In further embodiments MAX_TCA is set to another temperature determined not to be conducive to parasitic oxidation of ammonia by oxygen in an SCR system. Conditional 230 outputs true if TCA is less than MAX_TCA and, if not, outputs false. The output of conditional 230 is provided to operator 280.

Conditional 240 tests whether variable TCA is greater than MIN_TCA which is a calibratable minimum catalyst average temperature above which SCR diagnostics may be initiated. In one embodiment MIN_TCA is set to 350° C. In other embodiments MIN_TCA is set to a value between 300° C. and 400° C. In further embodiments MIN_TCA is set to another temperature determined not to be conducive to ammonia storage by an SCR catalyst. Conditional 240 outputs true if TCA is greater than MIN_TCA and, if not, outputs false. The output of conditional 240 is provided to operator 280.

Conditional 250 tests whether variable TC is less than MAX_TC which is a calibratable maximum catalyst temperature below which SCR diagnostics may be initiated. In one embodiment MAX_TC is set to 550° C. In other embodiments MAX_TC is set to a value between 500° C. and 600° C. In further embodiments MAX_TC is set to another temperature determined not to be conducive to parasitic oxidation of ammonia by oxygen in an SCR system. Conditional 250 outputs true if TC is less than MAX_TC and, if not, outputs false. The output of conditional 250 is provided to operator 280.

Conditional 260 tests whether variable TC is greater than MIN_TC which is a calibratable minimum catalyst temperature above which SCR diagnostics may be initiated. In one embodiment MIN_TC is set to 350° C. In other embodiments MIN_TC is set to a value between 300° C. and 400° C. In further embodiments MIN_TC is set to another temperature determined not to be conducive to ammonia storage by an SCR catalyst. Conditional 260 outputs true if TC is greater than MIN_TC and, if not, outputs false. The output of conditional 260 is provided to operator 280.

At operation 211 a value indicative of exhaust flow is stored as variable EX. The value of variable EX may be based upon information from a sensor such as sensor 141 or another sensor adapted to provide information indicative of exhaust flow such as exhaust mass flow rate, exhaust space velocity through an SCR catalyst, or another characteristic of exhaust flow. Variable EX is provided to conditional 270. Conditional 270 tests whether variable EX is less than MAX_EX which is a calibratable maximum exhaust flow value below which SCR diagnostics may be initiated. Conditional 270 outputs true if EX is less than MAX_EX and, if not, outputs false. The output of conditional 270 is provided to operation 280.

The outputs of conditionals 230, 240, 250, 260 and 270 are provided to inputs of operation 280. Operation 280 is a logical AND which outputs true when all of its inputs are true and, if not, outputs false. The output of operation 280 is provided to operation 290 where it is stored as variable INIT_DIAG which can be used to determine whether to initiate diagnosis of an SCR system. When variable INIT_DIAG is true, diagnosis of an SCR system may be initiated, if not, diagnosis of an SCR system may not be initiated.

Figure 3:
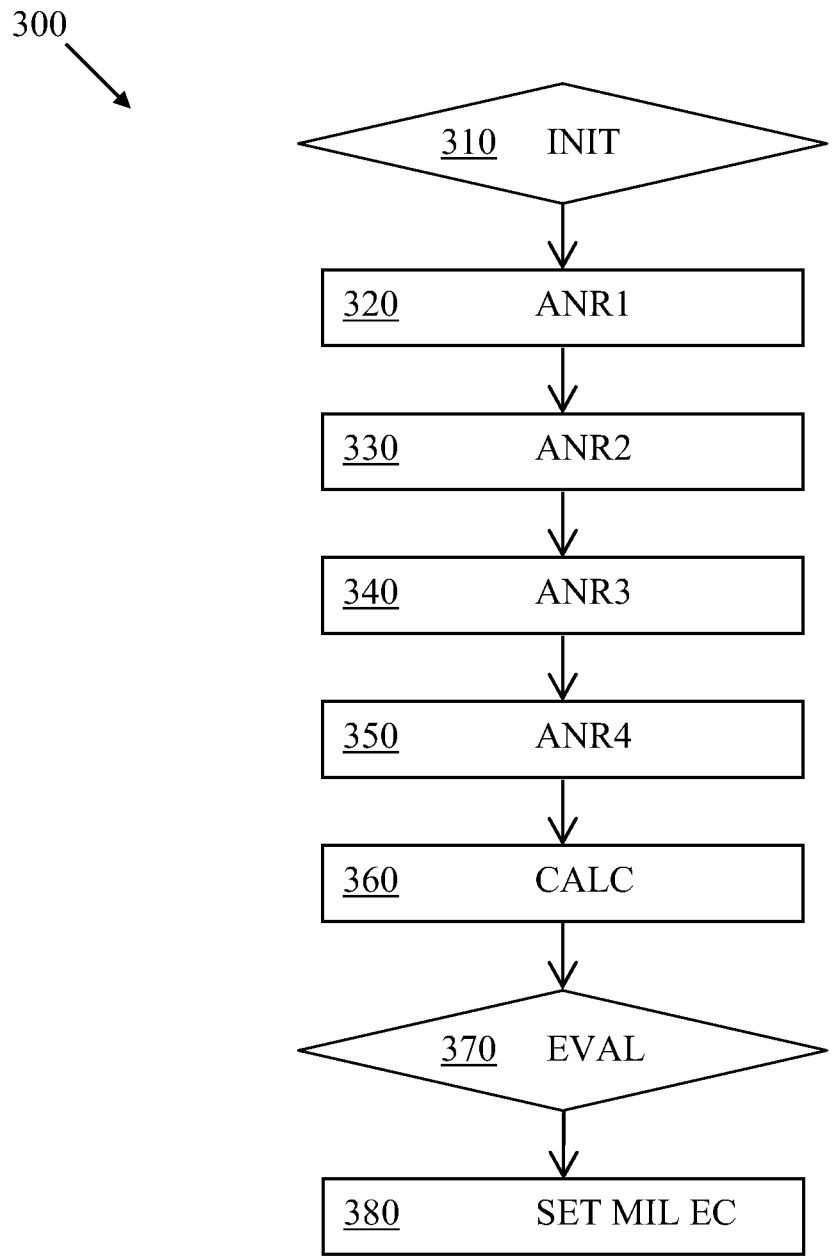
FIG. 3 is a flowchart illustrating an exemplary SCR diagnostic procedure

FIG. 3 is a flowchart illustrating an exemplary SCR diagnostic procedure 300. Procedure 300 may be implemented by controller 112 of vehicle 100 described above in connection with FIG. 1 or in another controller. Procedure 300 begins at conditional 310 which tests whether one or more conditions for initiating diagnosis are satisfied. In an exemplary embodiment conditional 310 tests whether variable INIT_DIAG of procedure 200 described above in connection with FIG. 2 is true. In other embodiments conditional 310 tests whether other conditions for initiating diagnosis are satisfied. If the conditions for initiating diagnosis are satisfied procedure 300 proceeds to operation 320. If the conditions for initiating diagnosis are not satisfied procedure 300 waits a predetermined time and retests one or more conditions for initiating diagnosis are satisfied.

From conditional 310 procedure 300 proceeds to operation 320. Operation 320 controls an SCR system to operate at a first commanded ammonia to NOx input ratio, i.e., a ratio of ammonia to NOx which is commanded to be provided to an SCR catalyst, and provides information indicative of the NOx output of the SCR system at the first commanded ammonia to NOx ratio.

From operation 320 procedure 300 proceeds to operation 330. Operation 330 controls an SCR system to operate at a second commanded ammonia to NOx input ratio and provides information indicative of the NOx output of the SCR system at the second commanded ammonia to NOx ratio.

From operation 330 procedure 300 proceeds to operation 340. Operation 340 controls an SCR system to operate at a third commanded ammonia to NOx input ratio and provides information indicative of the NOx output of the SCR system at the third commanded ammonia to NOx ratio.

From operation 340 procedure 300 proceeds to operation 350. Operation 350 controls an SCR system to operate at a fourth commanded ammonia to NOx input ratio and provides information indicative of the NOx output of the SCR system at the fourth commanded ammonia to NOx ratio.

In one embodiment operations 320, 330, 340, and 350 control an SCR system to operate at first, second, third and fourth commanded ammonia to NOx input ratios by commanding a reductant injector to inject first, second, third, and fourth amounts of reductant. The first, second, third, and fourth amounts of reductant may be selected based upon the ratio of reductant to ammonia and the NOx input to the SCR system. The ratio of reductant to ammonia may account for the concentration of the reductant utilized, the type of reductant utilized, and/or the degree of reductant decomposition. The amount of NOx may be determined using a virtual NOx sensor, for example, as described above in connection with FIG. 1. Additional embodiments include greater or fewer operations similar to operations 320, 330, 340, and 350 which control an SCR system to operate at a plurality of commanded ammonia to NOx input ratios, for example, by commanding a reductant injector to inject a plurality of amounts of reductant. Additional embodiments include control an SCR system to operate at first, second, third and fourth commanded ammonia to NOx input ratios by commanding a reductant injector to inject first, second, third, and fourth amounts of reductant and controlling operation of an engine to provide one or more amounts of NOx.

From operation 350 procedure 300 proceeds to operation 360 which determines a diagnostic parameter based upon the information indicative of the NOx output of the SCR system at the plurality of commanded ammonia to NOx input ratios. In an exemplary embodiment operation 360 calculates the slope of a line fitting the information indicative of the NOx outputs of the SCR system at the plurality of commanded ammonia to NOx input ratios. In another embodiment operation 360 calculates the slope and an intercept of a line fit to the information indicative of the NOx outputs of the SCR system at the plurality of commanded ammonia to NOx input ratios, for example, by performing a least squares fit or another linear regression on the information.

From operation 360 procedure 300 proceeds to conditional 370 which evaluates the diagnostic parameter to diagnose the SCR system. In an exemplary embodiment conditional 370 evaluates whether the slope is above a maximum slope limit, whether the slope is below a maximum slope limit, whether the intercept is above a maximum intercept limit, and whether the intercept is below a minimum intercept limit.

From conditional 370 procedure 300 proceeds to operation 380 where an indication of malfunction may be provided to an operator and a error code may be stored based upon the evaluation performed by conditional 370. In certain embodiments, if conditional 370 determines that the slope is above the maximum slope limit, operation 380 outputs a command to provide an indication and set an error code indicating that the reductant injector is providing greater than the commanded amount of reductant, or a malfunction of a NOx sensor. In certain embodiments, if conditional 370 determines that the slope is below the minimum slope limit, operation 380 outputs a command to provide an indication and set an error code indicating that the SCR catalyst function has degraded, that the reductant injector is providing less than the commanded amount of reductant, or a malfunction of a NOx sensor. In certain embodiments, if the intercept is above a maximum intercept limit, or below a minimum intercept limit, the diagnosis is determined to be unreliable and ignored. If the evaluated data is within prescribed limits no indication of malfunction is provided, no error code is stored and procedure 300 may return to conditional 310 or terminate.

Figure 4:
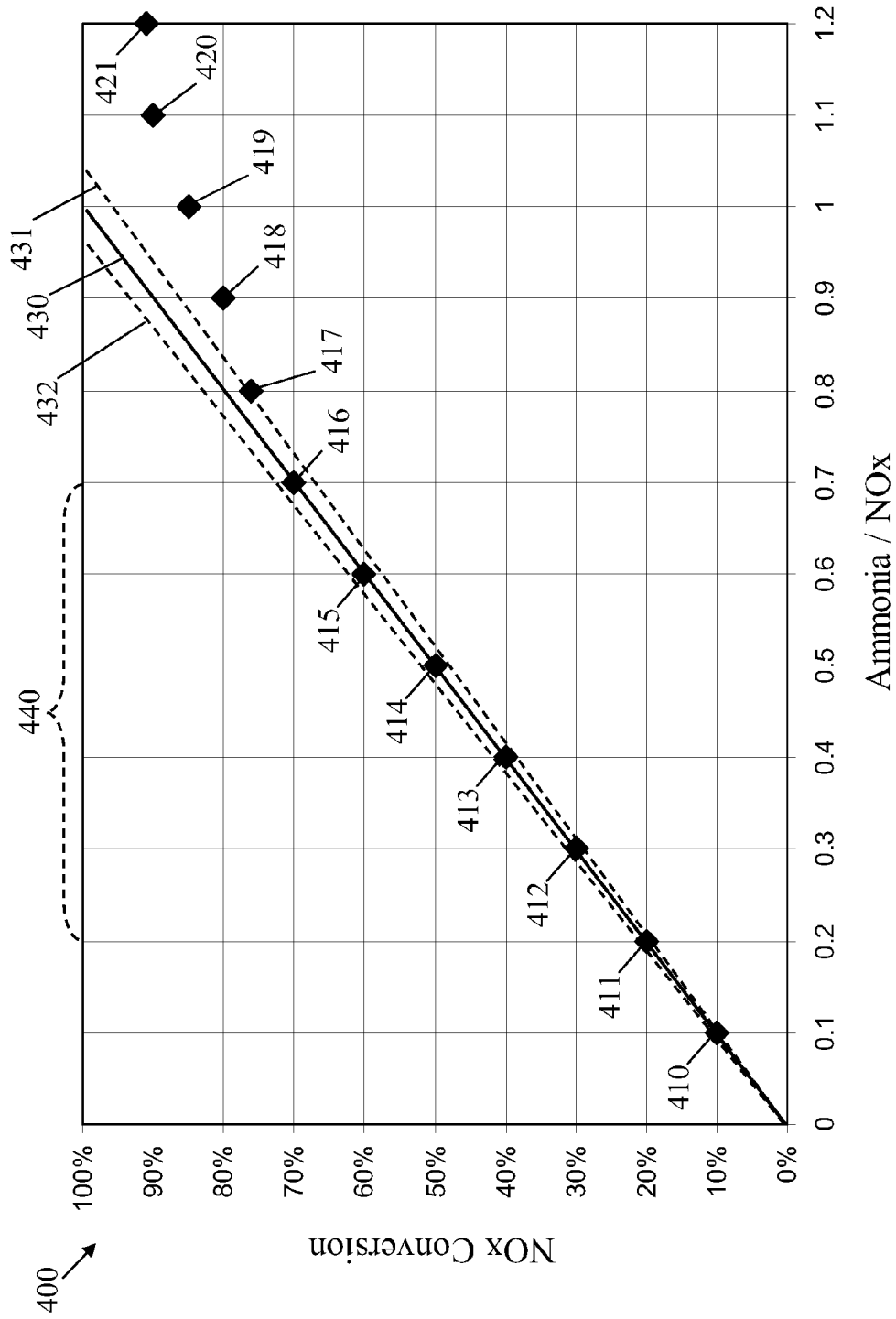
FIG. 4 is a graph illustrating exemplary SCR diagnostic criteria.

FIG. 4 is a graph 400 illustrating exemplary SCR diagnostic criteria. The horizontal axis of graph 400 indicates the ratio of ammonia to NOx provided to an SCR catalyst. The vertical axis of graph 400 indicates the percentage of NOx converted by the SCR catalyst. Data points 410-421 illustrate the relationship between percent NOx conversion and ammonia to NOx ratio. Over a range 440 of ammonia to NOx ratios the relationship between percent NOx conversion and ammonia to NOx input ratio is linear and falls along line 430 which has a slope of 100 and an intercept of zero. For ammonia to NOx ratios outside range 440, the relationship between percent NOx conversion and ammonia to NOx input ratio departs from line 430 as indicated by data points 417-421 or may result unnecessarily low NOx conversion for example, that indicated at data point 410. In the illustrated embodiment, range 440 extends from an ammonia to NOx ratio of 0.2 to an ammonia to NOx ratio of 0.7. Other embodiments include other ranges falling between about 0.7 and 0. Other embodiments include other ranges falling between about 0.8 and 0. Further embodiments include other ranges determined to provide a substantially linear relationship between NOx conversion and an ammonia to NOX input ratio. A linear or substantially linear relationship between percent NOx conversion and ammonia to NOx input ratio can be used to establish diagnostic criteria including maximum permissible slope 432, minimum permissible slope 431, a maximum intercept value and/or a minimum intercept value which can be utilized in a diagnostic procedure such as procedure 300 described above in connection with FIG. 3.

While exemplary embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating an SCR system at a plurality of non-stoichiometric ratios of commanded ammonia to NOx input;
   providing a plurality of data indicating NOx output from the SCR system for the plurality of non-stoichiometric ratios of commanded ammonia to NOx input; and
   evaluating the plurality of data to diagnose the SCR system;
   wherein the evaluating utilizes a diagnostic criterion based upon a relationship of the plurality of non-stoichiometric ratios and the plurality of data indicating NOx output;
   wherein said relationship is a relationship of linearity.

2. A method according to claim 1 further comprising storing an error code and actuating a malfunction indicator based upon the evaluating.

3. A method according to claim 1 further comprising evaluating an intercept of the plurality of data to determine reliability of the plurality of data.

4. A method according to claim 1 wherein the plurality of non-stoichiometric ratios of commanded ammonia to NOx input are in a range from 0.2 to 0.7.

5. A method according to claim 1 wherein the non-stoichiometric ratios comprise non-zero ratios.

6. A method according to claim 1 wherein the evaluating includes testing a slope of the plurality of data.

7. A method according to claim 6 wherein the testing includes first testing whether the slope is greater than a first value and second testing whether the slope is less than a second value.

8. A method according to claim 7 further comprising storing a first error code if the slope is greater than the first value, and storing a second error code if slope is less than the second value.

9. A method according to claim 8 wherein the first error code is indicative of an error in catalyst performance, under dosing of the SCR system, or a sensor error, and the second error code is indicative of over dosing of the SCR system, or the sensor error.

10. A method according to claim 1 further comprising testing a temperature of the SCR system and deciding whether to initiate the operating based upon the temperature.

11. A method according to claim 10 wherein the temperature is indicative of a catalyst temperature and the operating is initiated if the temperature is above a minimum value and below a maximum value.

12. A method according to claim 10 further comprising testing an exhaust flow characteristic of the SCR system and deciding whether to initiate the operating based upon the exhaust flow characteristic.

13. A system comprising:
   an SCR apparatus including an exhaust flow path, an SCR catalyst in fluid communication with the exhaust flow path, and an injector configured to inject reductant into the exhaust flow path; and
   a controller configured to perform a diagnostic routine, the diagnostic routine including commanding the injector to vary reductant injection over a range effective to vary a ratio of ammonia to NOx provided to the SCR catalyst, the range providing a plurality of non-stoichiometric ratios of ammonia to NOx to the SCR catalyst, receiving a plurality of data indicative of NOx output by the SCR apparatus within the range, and diagnosing a condition of the SCR apparatus based upon the plurality of data;
   wherein the diagnosing is based upon a predetermined relationship between the plurality of non-stoichiometric ratios and the plurality of data indicating NOx output;
   wherein the predetermined relationship is a linear relationship.

14. A system according to claim 13 wherein the reductant is urea.

15. A system according to claim 13 wherein the controller is an engine control module.

16. A system according to claim 13 provided in a vehicle.

17. A system according to claim 13 wherein the controller is configured to initiate the diagnostic routine based upon an indication of temperature of the SCR catalyst and an indication of exhaust flow through the SCR catalyst.

18. A system according to claim 13 wherein the non-stoichiometric ratios comprise a plurality of ratios greater than zero.

19. A system according to claim 13 wherein the controller is configured to store an error code and command an indicator to provide an indication of a malfunction of the SCR apparatus based upon the diagnostic routine.

20. A system according to claim 19 wherein the error code indicates one of injector overdosing and injector underdosing.

21. A system according to claim 19 wherein the error code indicates degradation of the SCR catalyst.

22. An apparatus comprising:
a non-transitory computer readable medium configured to store instructions executable by a controller to initiate a diagnosis of an SCR device based upon an indication of temperature of the SCR device and an indication an exhaust flow through the SCR device, and instructions executable by a controller to diagnose the SCR device by commanding the SCR device to operate at a plurality of commanded reductant injection levels, the plurality of commanded reductant injection levels providing non-stoichiometric input ratios of reductant to NOx, storing information of a plurality of NOx output levels from the SCR device at the plurality of commanded reductant injection levels, and evaluating the information to diagnose the SCR device; wherein the evaluating is based upon a known relationship between the non-stoichiometric input ratios of reductant to NOx and a plurality of NOx output data; wherein the known relationship is a linear relationship.

23. An apparatus according to claim 22 wherein the non-stoichiometric input ratios comprise a plurality of non-zero ratios.

* * * * *